United States Patent [19]

Izaguirre, Sr.

[11] Patent Number: 4,825,328

[45] Date of Patent: Apr. 25, 1989

[54] THREE PHASE ELECTRICAL LOAD PROTECTION DEVICE

[75] Inventor: Lowell F. Izaguirre, Sr., Miami, Fla.

[73] Assignee: Watsco Components, Inc., Hialeah, Fla.

[21] Appl. No.: 62,134

[22] Filed: Jun. 12, 1987

[51] Int. Cl.$^4$ .................. H02H 3/20; H02H 3/24
[52] U.S. Cl. ........................ 361/90; 361/91; 361/92
[58] Field of Search .............. 361/59, 71, 77, 85, 361/86, 89, 90, 91, 92; 340/658, 660, 662, 663; 324/83 R, 86

[56] References Cited

U.S. PATENT DOCUMENTS

| | | | |
|---|---|---|---|
| 3,341,748 | 9/1967 | Kammiller | 361/187 |
| 3,535,591 | 10/1970 | Holmqueot | 361/90 X |
| 3,590,325 | 6/1971 | McMillen | 361/388 |
| 3,657,603 | 4/1972 | Adams | 361/56 |
| 3,679,964 | 7/1972 | Nowell | 361/18 |
| 3,800,198 | 3/1974 | Graf et al. | 318/806 |
| 3,813,667 | 5/1974 | Smith | 361/90 X |
| 3,836,790 | 9/1974 | Becker | 361/90 X |
| 4,333,119 | 6/1982 | Schoenmeyr | 361/77 X |
| 4,507,713 | 3/1985 | Hsich | 361/92 |
| 4,584,623 | 4/1986 | Bello et al. | 361/90 |
| 4,703,191 | 10/1987 | Ferguson | 361/92 X |

Primary Examiner—Derek S. Jennings
Attorney, Agent, or Firm—Dominik, Stein, Saccocio, Reese, Colitz & Van Der Wall

[57] ABSTRACT

A three phase electrical load protection device is disclosed including an input transducer for detecting each phase voltage and the direction of rotation of the phases of a three phase power system. A control monitor is disclosed for monitoring signals from the input transducer representative of the highest and lowest phase voltages and the direction of rotation of the phases for controlling an output device for disconnecting the electrical load when improper supply conditions are detected and monitored.

14 Claims, 2 Drawing Sheets

THREE PHASE ELECTRICAL LOAD PROTECTION DEVICE

BACKGROUND OF THE INVENTION

1. Field of the Invention

This invention relates to electrical load protection devices. More particularly, this invention relates to a three phase electrical load protection device which monitors the three phase supply mains connected to a three phase electrical apparatus to disconnect the electrical apparatus from the supply mains when the supply voltages exceed or fall below adjustable predefined limits.

2. Description of the Background Art

Presently, there exist many types of electrical load protection devices designed to protect an electrical apparatus from overvoltage and undervoltage conditions. More particularly, U.S. Pat. No. 3,657,603 discloses an electrical load protection device connected to a switching relay which disconnects the supply voltage to the electrical apparatus when the line voltage is either below a bottom limit for a definite length of time or above a top limit. The device then automatically reconnects the line voltage to the electrical apparatus a predetermined time after the supply voltage returns to a value between the predefined top and bottom limits. U.S. Pat. No. 4,584,623 discloses another electrical load protection device which provides for a selection of a nominal line voltage which then determines the actual minimum and maximum pressure threshold voltages. This device also includes a delay circuit for delaying the reconnection of supply voltage to the electrical load for a period of time after the supply voltage returns to a normal level.

Related voltage and current protection devices, particularly adaptable for d-c operation, are disclosed in U.S. Pat. Nos. 3,590,325, 3,341,748, 3,679,964 and 3,800,198.

Each of the load protection devices disclosed in the above referenced patents are operable in conjunction with only single phase supply voltages. Such devices are not capable of simultaneously monitoring the voltage levels of a three phase supply, nor are such devices capable of determining when such phases have been improperly connected to the electrical load.

Therefore, it is an object of this invention to provide an apparatus which overcomes the aforementioned inadequacies of the prior art devices and provides an improvement which is a significant contribution to the advancement of the electrical load protection art.

Another object of this invention is to provide a three phase electrical load protection device for monitoring three phase supply mains connected to an electrical load apparatus which disconnects the electrical load from the supply mains if any phase of the mains fall outside predefined over or undervoltages.

Another object of this invention is to provide a three phase electrical load protection device which monitors the phase rotation of three phase supply mains to prevent voltage from being supplied to the electrical load when the direction of such phase rotation is improper.

Another object of this invention is to provide a three phase electrical load protection device including means for automatically restoring the three phase supply mains a different predetermined delay after disconnecting and a predetermined time after the mains are restored to prevent the electrical load from being cycled too rapidly.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a three phase electrical load protection device including an input transducer for detecting each phase voltage and the direction of rotation of the phases of a three phase power system and a control monitor for monitoring signals from the input transducer representative of input voltages and direction of rotation of the phases and for controlling an output device for disconnecting the electrical load when improper supply conditions are detected and monitored.

More particularly, the input transducer of the invention comprises a power supply for providing power to operate the circuitry of the invention, a measuring circuit which measures input voltage conditions for each phase, a high and low voltage latch which detects and holds the highest and lowest voltage of the three phases, and a phase detector for measuring the direction of rotation of the phases relative to one another. The control monitor comprises high and low voltage comparators for comparing high and low voltage signals from the transducer to a preestablished reference to detect overvoltage and undervoltage conditions, a nuisance fault time delay for delaying the opening or closing of the output control device to assure that valid conditions exist, a control voltage monitor which monitors the control voltage, a power failure monitor which detects the existence of a total power failure, and a delay-on-break time delay which monitors total power failure and prevents the output control device from reenergizing for a defined period.

Thus, the electrical load protection device of the invention monitors the supply voltages of a three phase system connected to a three phase electrical load to determine if the supply phase voltages are at proper voltage levels and direction of rotation relative to one another. If such direction of rotation of the phases is not proper or if the voltage level of any one or more of the three phases falls outside of the predefined over and undervoltage levels, then supply phase voltages to the electrical load are prevented or interrupted until after the suppply voltages have been properly connected or have returned to proper voltage levels. Then, the electrical load may be manually restored by the resetting of the switch, automatically restored after a predetermined time delay following disconnect and a predetermined time after the supply voltages have returned to proper limits, or automatically restored a different predetermined delay after disconnect at a predetermined time after the supply voltages return to normal limits.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Input Transducer

Figure 1:
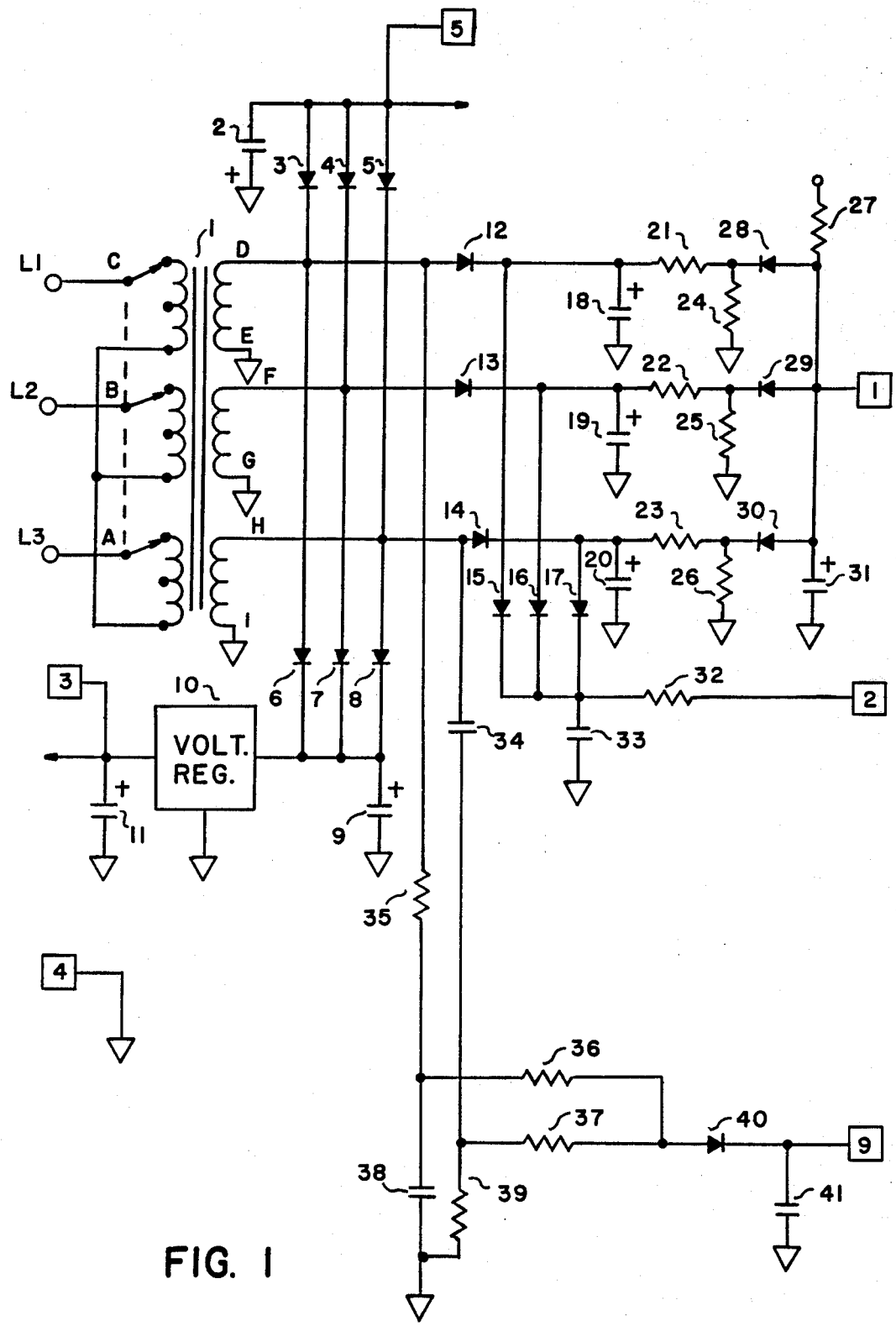
FIG. 1 is a schematic diagram of the input transducer of the invention.
Figure 2:
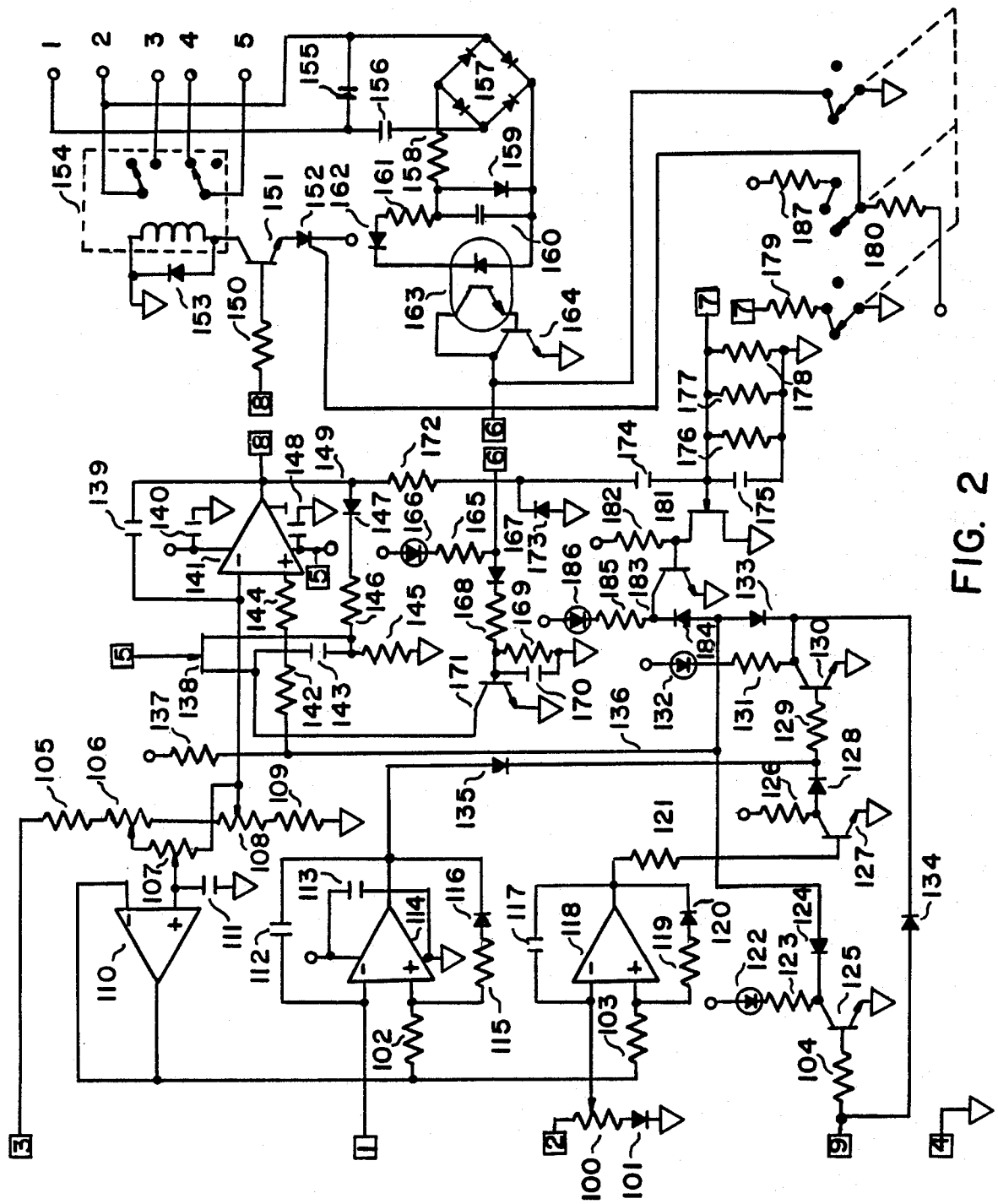
FIG. 2 is a schematic diagram of the control monitor of the invention.

Referring to FIG. 1, the input transducer of the invention comprises an input transformer one having three single phase units with the primary windings L1, L2 and L3 connected in a WYE configuration similar to the actual connections in a polyphase induction motor.

1. Power Supply

The input transducer provides power to the entire device. Specifically, positive voltage is provided via rectifier diodes 6, 7 and 8, capacitor 9 and voltage regulator 10, the output of which is further smoothed by means of capacitor 11 to provide a continuous positive voltage at reference point 3. Similarly, negative voltage is rectified via diodes 3, 4 and 5 and capacitor 2 to provide a continuous negative voltage at reference point 5.

2. Measuring Circuit and High and Low Voltage Latch

Each of the secondary windings of transformer 1 are rectified separately and measured. Specifically, referring to the L1 secondary, its output 1d is rectified through diode 12 and charges capacitor 18 to a value representative of the highest input voltage. This value is coupled through diode 15 and charges capacitor 33 to a value representative of the highest voltage present. The same value is divided by resistors 21 and 24 and coupled through diode 28 to discharge capacitor 31 to a value representative of the lowest voltage present.

Regarding the L2 and L3 secondaries, their outputs 1f and 1h are rectified through diodes 13 and 14 and charges capacitors 19 and 20 to value representatives of their highest input voltages, respectively. These values are then coupled through diodes 16 and 17, respectfully, to charge capacitor 33 to a value representative of the highest voltage present. The same values are then divided by resistors 22 and 25 and 23 and 26 and coupled through diodes 29 and 30, respectfully, to discharge the capacitor 31 to a value representative of the lowest voltage present.

From the foregoing, it is evident that as the phases appear in rotation on the transformers windings L1, L2 and L3 and in turn at diodes 12, 13 and 14, the charge on capacitor 33 at reference point 2 is representative of the highest voltage present on any of the three phases and the charge on capacitor 31 at reference point 1 is representative of the lowest voltage present on any of the three phases.

3. Phase Detector

The phase reverse circuit detector samples the first and third secondaries L1 and L3 of transformer 1 by means of resistor 35 and capacitor 38 and capacitor 34 and resistor 39, respectively. These RC networks rotate such voltages 90 degrees from phase and are sensed with resistors 36 and 37, respectively. If the L1 phase is ahead of L2 phase, the two signals are cancelled at the junction of resistors 36 and 37 and diode 40. If the L2 phase is ahead of the L1 phase, the two signals are added at the junction thereby producing a positive signal at reference point 9. Thus, it can be appreciated that a positive signal is provided at reference point 9 only when supply voltages in proper rotation are present at the primaries of transformer 1.

Control Monitor

1. Voltage Reference.

The purpose of the reference is to provide the signals from which the measurements are performed. From the regulated voltage supply 10, a voltage divider resistor 105, potentiometer 106, potentiometer 108, resistor 109 is established. Potentiometer 107 is connected to the wipers of potentiometer 106 and potentiometer 108. Potentiometer 106 and potentiometer 108 are adjusted to provide voltages equal to the highest and lowest voltages sensed and output by the input transducer. This makes the wiper of the potentiometer 107 representative of the range of the input transducer, and a dial can be scaled to concur with the desired range monitored by the transducer.

2. Under-voltage Over-voltage Comparator.

The purpose of this circuit is to determine if the signals from the input transducer are proper for normal operation. The potentiometer 107 wiper is connected to input of an operational amplifier 110-3 connected as a follower and provides a means of preventing loading of the potentiometer. The output of 110-1 is connected to the inputs of operational amplifier 114-3 and operational amplifier 118-5 through resistor 102 and resistor 103. This reference signal provides the comparison for operational amplifier 114 and operational amplifier 118 to compare transducer signals 1 and 2 respectfully. If the voltage from reference point 1 compared at operational amplifier 114-2 is lower than the reference, the output of operational amplifier 114 is high and is coupled through diode 135 and resistor 129 to transistor 130b, turning transistor 130c on (low). If the voltage from reference point 2 compared at operational amplifier 118 is higher than the reference, the output of operational amplifier 118-7 is low, and is coupled through resistor 121 to transistor 127b, turning it off. This causes the collector of transistor 127c to be high, and is coupled through diode 128, resistor 129 to transistor 130c which turns on transistor 130. Thus if any transducer input senses a voltage too low or too high, the output of transistor 130 is low. This causes the Voltage/Phase Loss light Emitting diode 132 to turn on, and is coupled through diode 133 as well, causing the summing line 136 to resistor 137 to go low.

3. Phase Reversal.

The purpose of this circuitry is to indicate and measure if the rotation of the phases are correct. If the signal at reference point 9 is high, it is coupled through resistor 104 to transistor 125b, causing transistor 125c collector to go low. This turns on Phase Reverse Light Emitting diode 122 through resistor 123 and is coupled through diode 124 as well, causing the summing line to resistor 137 to go low. However, if a phase is lost, that is part of this measurement, the signal at transistor 130c is coupled through diode 134 causing the signal at resistor 104 to remain low, effectively disabling the phase reversal circuit, preventing false indications.

4. Nuisance Fault Time Delay.

The purpose of this circuit is to provide a delay between detection of phase and voltage faults or any fault clear and the operation of the control relay. The control signal on the summing line 136 is connected to an integrator, comprising resistor 142, capacitor 143 and resistor 145. This integration is coupled through resistor 144 to operational amplifier 141-5. The other input to operational amplifier 141-6 is connected to the wiper of potentiometer 108 providing a reference point. As the voltage at the junction of resistor 142 capacitor 143 decreases below the reference signal, the output of operational amplifier 141 goes low and is connected to reference point 8 (149). This low causes diode 147 through resistor 146 to stop conducting positive signal to resistor 145, decreasing the voltage at resistor 142-capacitor 143 insuring full low output of operational amplifier 141-7.

5. Control Voltage Monitor.

The purpose of this circuit is to monitor the presence of control voltage to the system being monitored and provide a signal indicating its activation. It provides a means of monitoring a wide range of alternating current control voltages without adjustments. The input terminals 1 and 2 are connected to capacitor 155, a filter to prevent interference, and to capacitor 156, a coupling capacitor. The voltage present at input terminals 1 and 2 are coupled through capacitor 156 to Bridge 157, a diode AC to Dc converter. The output of Bridge 157 is coupled through resistor 158 to zener diode 159 limiting the voltage, and capacitor 160, a filter. This limited filtered voltage is connected to opto-coupler 163-1 and 163-2 through resisitor 161 and zener 162 causing 163-5 to turn on. The output of 163-4 is connected to transistor 164-b in a darlington pair configuration, increasing its sensitivity, and causing transistor 164c to go low and is present at reference point 6. This low is connected through resistor 165 to the Control Voltage On Light Emitting diode 166 turning it on, and at the same time, causes diode 167 to stop conduction, removing the positive signal through resistor 169 to transistor 171b. This causes transistor 171c to turn off, allowing the integrator resistor 142 capacitor 143 to function. Conversely, when the monitored control voltage is removed, transistor 171 discharges capacitor 143 immediately, causing resistor Point 8 (149) to go low without integration.

6. Monitored Power Failure Monitor.

The purpose of this circuit is to provide a means of detecting the removal or loss of the Monitored Power. The circuit comprises the negative <−§ power supply and transistor 138. When the Monitored Power is lost, the <−§ supply discharges to zero volts rapidly. This is connected to transistor 138g and causes transistor 138d to turn on, discharging capacitor 143 immediately, causing reference point 8 to go low without delay.

7. Delay on Break Time Delay.

The purpose of this circuit is to monitor the reference point 8 (149). Any time reference point 8 (149) goes low, indicating a fault of any kind has occurred, this circuit insures that reference point 8 (149) stays low for some finite period of time, which is selected by switch 180-5,6,7, adding or not the value of resistor 179, and the values of resistor 176, resistor 177 and resistor 178. The purpose of having multiple resistors is to allow trimming of the timing during testing. The normal high voltage at reference point 8 149 is coupled through resistor 172 and charges capacitor 174. If a fault occurs, reference point 8 149 will go low and the charge on capacitor 174 will be transferred to the gate of transistor 181g, turning it off. This causes transistor 181d to go high through resistor 182 and turn on transistor 183b. transistor 183c goes low, turning on Time Delay On Light Emitting diode 186 and through diode 184, to the summing line 136 to go low until the charge on capacitor 174 is drained through resistor 176, resistor 177, resistor 178 and if switched in by switch 180-5 or 6, resistor 180.

8. Output Control Device.

The purpose of this circuit is to act on information present at reference point 8 149 and to be able to lock the relay 154 off at the time of a fault. If reference point 8 149 is high, conditions are acceptable for system operation, and this high is coupled through resistor 150 to transistor 151b, turning transistor 151c on. If Switch 180c is in the MAN position, transistor 152g is off, not allowing transistor 152a to energize. If Switch 180c is in the Reset/Auto or in the 5 Minute Time Delay position, the positive supply is coupled through resistor 187 to transistor 152g, turning it on. When both transistor 152a and transistor 151c are on, Relay 154 is energized, closing the contacts between Control Terminals 2 and 3.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described, what is claimed is:

1. An input transducer for a multiphase electrical power system to provide a first signal and a second signal representative of the highest and lowest voltages, respectively, of any of the phases of the power system, said input transducer comprising in combination:

means for rectifying the voltage of each phase and charging a first storage means to a voltage value representative of the highest voltage present on said phase;

first means for coupling the voltage value of each said first storage means representative of the highest voltage present for each phase to charge a second storage means to a voltage value representative of the highest voltage present on any phase of the power system; and second means for coupling the voltage value of each said first storage means representative of the highest voltage present to discharge a third storage means to a voltage value representative of the lowest voltage present on any phase of the power system.

2. The input transducer as set forth in claim 1, wherein said multi-phase power system comprises a conventional three-phase power system in which each phase differs by one-third of a cycle, said input transducer further comprising a phase reverse detector including means for rotating signals from the first and third phase by substantially ninety degrees and then summing such signals such that a positive voltage signal is produced if the second phase signal is ahead of the first phase signal and a near-zero voltage signal is produced if the first phase signal is ahead of the second phase signal.

3. The input transducer as set forth in claim 2, wherein each said storage means comprises a capacitor and wherein said second means for coupling the voltage value of each said first storage means comprises a resistive divider connected to a diode allowing said third storage means to discharge through said diode and said resistive divider.

4. The input transducer as set forth in claim 3, further comprising an input transformer having primary windings connected in a WYE configuration to the three-phase power system and secondary windings connected to said rectifying means.

5. The input transducer as set forth in claim 4, further including power supply means connected to each of said phases of said secondary windings of said transformer for providing rectified positive voltage and negative voltage.

6. A method for providing a first signal and a second signal representative of the highest and the lowest voltages, respectively, of any of the phases of a multi-phase electrical power system, comprising the steps of:
  rectifying the voltage of each phase and charging a first storage means for each phase to a voltage value representative of the highest voltage present on such phase;
  coupling the voltage value of each said first storage means representative of the highest voltage present for each phase to charge a second storage means to a voltage value representative of the highest voltage present on any phase of the power system; and
  coupling the voltage value of each said first storage means representative of the highest voltage present of said phase to discharge a third storage means to a voltage value representative of the lowest voltage present on any phase of the power system.

7. The method as set forth in claim 6, wherein the multi-phase power system comprises a conventional three phase power system in which each phase differs by one third of a cycle, the method further comprising the step of protecting phase reversal of said phases by rotating signals from the first and third phase by substantially ninety degrees and then summing such signals such that a positive voltage signal is produced if the second phase signal as ahead of the first phase signal and a near zero voltage signal is produced if the first phase signal is ahead of the second phase signal.

8. An input transducer for a multi-phase electrical power system to provide a first signal and a second signal representative of the highest and lowest currents, respectively, of any of the phases of the power system, said input transducer comprising in combination:
  means for charging a first storage means for each phase to a value representative of the highest current present on said phase;
  first means for coupling the value of each said first storage means representative of the highest current present for each phase to charge a second storage means to a value representative of the highest current present on any phase of the power system; and
  second means for coupling the value of each said first storage means representative of the highest current present to discharge a third storage means to a value representative of the lowest current present on any phase of the power system.

9. The input transducer as set forth in claim 8, wherein said multi-phase power system comprises a conventional three-phase power system in which each phase differs by one-third of a cycle, said input transducer further comprising a phase reverse detector including means for rotating signals from the first and third phase by substantially ninety degrees and then summing such signals such that a positive voltage signal is produced if the second phase signal is ahead of the first phase signal and a near-zero voltage signal is produced if the first phase signal is ahead of the second phase signal.

10. The input transducer as set forth in claim 9, wherein each said storage means comprises a capacitor and wherein said second means for coupling said value of each said first storage means comprises a resistive divider connected to a diode allowing said third storage means to discharge through said diode and said resistive divider.

11. The input transducer as set forth in claim 10, further comprising an input transformer having primary windings connected in a WYE configuration to the three-phase power system and secondary windings connected to said charging means.

12. The input transducer as set forth in claim 11, further including power supply means connected to each of said phases of said secondary windings of said transformer for providing rectified positive voltage and negative voltage.

13. A method for providing a first signal and a second signal representative of the highest and the lowest currents, respectively, of any of the phases of a multi-phase electrical power system, comprising the steps of:
  charging a first storage means for each phase to a value representative of the highest current present on such phase;
  coupling the value of each said first storage means representative of the highest current present for each phase to charge a second storage means to a value representative of the highest current present on any phase of the power system; and
  coupling the value of each said first storage means representative of the highest current present of said phase to discharge a third storage means to a value representative of the lowest current present on any phase of the power system.

14. The method as set forth in claim 13, wherein the multi-phase power system comprises a conventional three phase power system in which each phase differs by one third of a cycle, the method further comprising the step of detecting phase reversal of said phases by rotating signals from the first and third phase by substantially ninety degrees and then summing such signals such that a phase reversal signal is produced if the second phase signal is ahead of the first phase signal.

* * * * *